(12) United States Patent
Dimatteo

(10) Patent No.: US 12,065,716 B2
(45) Date of Patent: Aug. 20, 2024

(54) METHOD FOR THE ADDITIVE PRODUCTION OF AN ARTICLE

(71) Applicant: NUOVO PIGNONE TECNOLOGIE—S.r.l., Florence (IT)

(72) Inventor: Antonella Dimatteo, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 596 days.

(21) Appl. No.: 17/320,831

(22) Filed: May 14, 2021

(65) Prior Publication Data

US 2021/0269895 A1 Sep. 2, 2021

Related U.S. Application Data

(63) Continuation of application No. PCT/EP2019/025400, filed on Nov. 18, 2019.

(51) Int. Cl.

| | |
|---|---|
| *C22C 1/04* | (2023.01) |
| *B22F 10/28* | (2021.01) |
| *B22F 10/36* | (2021.01) |
| *B22F 10/366* | (2021.01) |
| *B22F 10/37* | (2021.01) |
| *B22F 12/41* | (2021.01) |
| *B23K 26/34* | (2014.01) |
| *B23K 26/342* | (2014.01) |
| *B33Y 10/00* | (2015.01) |
| *B33Y 70/00* | (2020.01) |
| *B33Y 80/00* | (2015.01) |
| *C22C 19/05* | (2006.01) |
| *B23K 26/082* | (2014.01) |
| *B23K 101/00* | (2006.01) |

(52) U.S. Cl.
CPC ............ *C22C 1/0433* (2013.01); *B22F 10/28* (2021.01); *B22F 10/36* (2021.01); *B22F 10/366* (2021.01); *B22F 10/37* (2021.01); *B22F 12/41* (2021.01); *B23K 26/342* (2015.10); *B33Y 10/00* (2014.12); *B33Y 70/00* (2014.12); *B33Y 80/00* (2014.12); *C22C 19/055* (2013.01); *B22F 2301/15* (2013.01); *B23K 26/082* (2015.10); *B23K 2101/001* (2018.08)

(58) Field of Classification Search
CPC ....... C22C 19/055; B33Y 10/00; B33Y 80/00; B23K 26/342
See application file for complete search history.

(56) References Cited

U.S. PATENT DOCUMENTS

| | | |
|---|---|---|
| 2005/0069450 A1 | 3/2005 | Jiang et al. |
| 2016/0082511 A1 | 3/2016 | Cui et al. |
| 2016/0348216 A1 | 12/2016 | Szuromi et al. |
| 2017/0021415 A1 | 1/2017 | Etter et al. |
| 2018/0250776 A1 | 9/2018 | Cui et al. |

FOREIGN PATENT DOCUMENTS

| | | | |
|---|---|---|---|
| CN | 1886526 A | 12/2006 | |
| CN | 110918987 A * | 3/2020 | ............ B22F 3/105 |
| GB | 2506494 A | 4/2014 | |
| WO | 2005056852 A2 | 6/2005 | |

OTHER PUBLICATIONS

English Abstract and English Machine Translation of Cao (CN 110918987A_(Mar. 27, 2020).*
Trevor Keller, et al., "Application of Finite Element, Phase-field, and CALPHAD-based Methods to Additive Manufacturing of Ni-based Superalloys", Arxiv.org, Cornell University Library, 201 Olin Library Cornell University, Ithaca, NY, May 4, 2017, whole document.

* cited by examiner

*Primary Examiner* — Jessee R Roe
(74) *Attorney, Agent, or Firm* — Paul Frank + Collins P.C.

(57) ABSTRACT

Method for the additive production of three-dimensional articles is disclosed. A powder layer of nickel-based metal alloy having a specific composition is scanned with an energy source so as to melt the powder in at least one point of the layer. Afterwards the energy source is removed from this point so as to solidify the metal alloy and form a layer with a desired shape. Also disclosed are articles obtainable by this method.

10 Claims, 3 Drawing Sheets

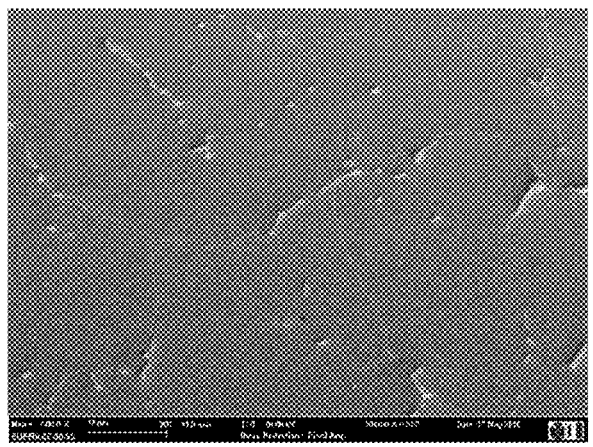
Figure 1 - RELATED ART
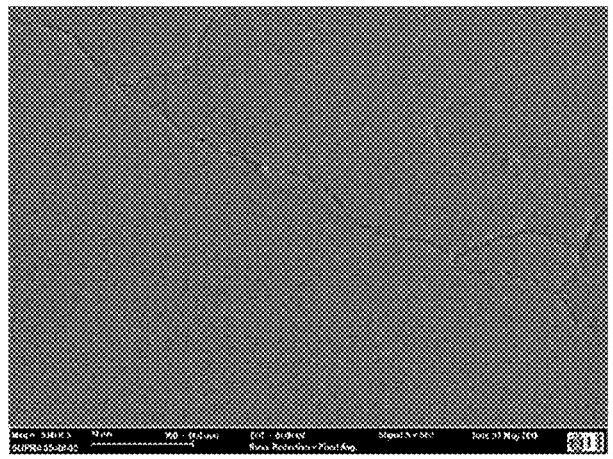
Figure 2

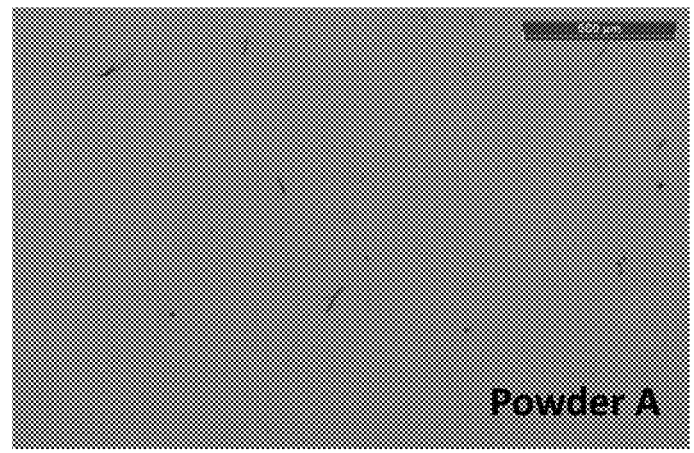
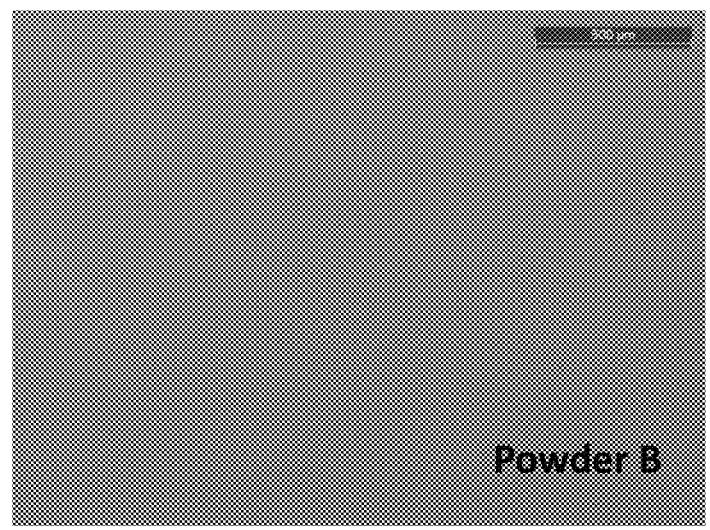
Figure 5

METHOD FOR THE ADDITIVE PRODUCTION OF AN ARTICLE

CROSS-REFERENCE TO RELATED APPLICATIONS

This application is the U.S. national stage application filed pursuant to 35 U.S.C. 365(c) and 120 as a continuation of International Patent Application No. PCT/EP2019/025400, filed Nov. 18, 2019, which application claims priority from Italian Patent Application No. 102018000010450, filed Nov. 20, 2018, which applications are incorporated herein by reference in their entireties.

TECHNICAL FIELD

The subject-matter disclosed herein relates generally to additive manufacturing, and more specifically to a method for additively producing a three-dimensional article. The method includes subjecting a powder layer of nickel-based metal alloy having a specific composition to scanning with an energy source, which melts the powder in at least one point of the layer. The method further includes removing the energy source from the at least one point of the layer, which causes the metal alloy to solidify and form a layer with a desired shape. Also disclosed herein are an article obtainable by said method, such as a component of a turbine or a component of other types of turbomachinery equipment, which may include but are not limited to, pumps, valves, compressors, engines, turbines; and the use of such article as a component of an apparatus comprising a turbine or other type of turbomachinery equipment.

BACKGROUND ART

Additive casting ("additive manufacturing") is a group of processes characterized by the production of three-dimensional components by stacking a plurality of substantially two-dimensional layers. Each layer is generally very thin (for example between about 20 and about 100 microns) and many overlapping layers are formed in sequence with the two-dimensional shape which varies on each layer to provide a solid article having the desired final three-dimensional profile Contrary to the traditional "subtractive" production processes in which the material is removed to form the desired profile of an article, for example a component of a machine, additive manufacturing processes progressively add polymeric or metallic material to form the article having the final shape or an almost final shape.

Additive production allows producing complex items with great precision, drastically reducing the time between design, prototyping and realization and the total costs of the article, substantially eliminating waste and most of the tools needed for production using traditional methods. Examples of additive manufacturing processes are reported in GB2506494 A.

Efficient additive manufacturing would be beneficial for the manufacture of superalloy components, for example for the production of gas turbine engine components, for the aerospace industry and other applications.

The "superalloys" are metal alloys designed for high performance at high temperatures. In particular, "superalloy" generally means an alloy with excellent mechanical strength and resistance to viscous deformation ("creep") at high temperatures.

The nature of superalloy materials, however, results in various difficulties for additive manufacturing. For example, the resistance to high temperatures of a superalloy is the result of a microstructure, which makes them subject to the formation of cracks. A certain number of superalloys are generally considered "hard to weld" (HTW), hence they are difficult to form in an additive production process, due to their tendency to cracking, in particular for nickel-based super alloys with a high percentage of gamma-prime phase forming elements such as aluminum and titanium. It is generally believed that the presence of aluminum and/or titanium in amounts of more than about 3% involves the formation of primary gamma phase in fractions of volume of more than about 30%, which makes the material hard to weld (HTW).

The incorporation of HTW materials would be desirable, in particular for some parts of components subject to the most extreme conditions and stresses, in consideration of their operative properties, which are often higher than those of the materials generally used.

In particular, in the field of turbines, compressors and pumps for "oil & gas" applications, it would be advantageous to have components with excellent resistance to mechanical and thermal stresses.

HTW materials can be incorporated, as non-limiting example, into turbine engine components such as aerodynamic profiles, blades, nozzles, guards, rotating turbine components, wheels, gaskets, 3D-manufactured components with HTW alloys and components that can come into contact with high-temperature and/or high-pressure and/or corrosive/erosive gases.

During operation, components formed in HTW can be subject to operating conditions that result in wear or damage to parts of the component. By way of example, the tips of the aerodynamic profiles of the turbines, such as the blades, can be consumed over time, reducing the efficiency of the turbine.

Repairs to these worn parts are impractical due to the difficulty of combining HTW materials, making standard repair techniques difficult. Reconstruction of such components using hot processes such as laser coating or conventional thermal jet results in the deposition of material that can be weakened or cracked by high temperatures. Soldering techniques are not suitable because the brazing materials that are incorporated into the component can hardly meet the operational requirements.

Examples of superalloys are reported in US 2017/0021415 A1, which concerns an alloy with a high content of iron, chromium and molybdenum ("hastelloy" type) and US 2016/0348216 A1, which concerns a nickel-based alloy with a high weight content of tungsten (9.5-10.5%) and aluminum (5.3-5.7%), and in US2016/0082511 A1, wherein a nickel-based alloy containing from about 0.002 to about 0.015 weight percent boron for direct metal laser melting is disclosed.

Currently available gas turbine components incorporating HTW materials tend to be more expensive than components made from other materials, and some HTW materials are more difficult to weld and more expensive than others. In addition, the difficulties in repairing gas turbine components with HTW materials can lead to discarding components due to damage or defects that would otherwise be repairable in components made of other materials, resulting in increased costs. The same properties that make it difficult to repair HTW materials also make it difficult to combine HTW materials with other less expensive and easily repairable materials.

SUMMARY

In one aspect, the subject-matter disclosed herein is directed to a method for the additive production of a three-dimensional article made of a specific metal alloy, which is regarded as a hard to weld ("HTW") material. The method disclosed herein allows the production of very complex metal articles in relatively short times and substantially without the need for machining the resulting article.

In another aspect, the subject-matter disclosed herein relates to a three-dimensional metal alloy article made according to said method. The article disclosed herein has superior resistance to thermal and mechanical stresses and can be used for example, but without limitation, as a component of turbine engines In another aspect, the subject-matter disclosed herein relates to the use of said article as a component of an apparatus comprising a turbine or a compressor or a pump.

BRIEF DESCRIPTION OF THE DRAWINGS

A more complete appreciation of the disclosed embodiments of the disclosure and many of the attendant advantages thereof will be readily obtained as the same becomes better understood by reference to the following detailed description when considered in connection with the accompanying drawings, wherein:

FIG. 1 illustrates the surface of an article produced by a conventional process (investment casting, i.e. based on a lost wax technique);

FIG. 2 illustrates the surface of an article produced by the process as disclosed herein;

FIG. 5 illustrates the micrographies of two materials obtained via the method of as disclosed herein starting from a nickel-based alloy comprising boron (powder A) and from a nickel-based alloy not comprising boron (powder B).

DETAILED DESCRIPTION OF EMBODIMENTS

According to one aspect, the subject-matter disclosed herein provides a method for the additive production of a three-dimensional metal alloy article, comprising the steps of:
i. preparing a layer of powder of a metal alloy on a substrate;
ii. subjecting the powder layer prepared in the previous step to scanning with an energy source so as to melt the powder in at least one point of the layer and removing the source of energy from said point so as to solidify the metal alloy and form a layer with a desired shape;
iii. re-preparing a layer of metal alloy powder, which is in direct contact with the solidified metal alloy layer obtained in step ii.;
iv. repeating the steps ii. and iii. until the desired three-dimensional metal alloy object is obtained,
wherein said metal alloy powder consists of, with respect to the total weight of the powder: from about 22% to about 23% chromium, from about 18% to about 20% cobalt, from about 1.5% to about 2.5% tungsten, from about 0.5% to about 1.5% niobium, from about 1.8% to about 2.7% titanium, from about 1.0% to about 2.0% aluminum, from about 0.02 to about 1.20% tantalum, from about 0.04% to about 0.2% carbon, and the remaining to 100% is nickel and inevitable impurities.

The advantages are numerous and include the fact that the article as disclosed herein is characterized by higher mechanical strength and fatigue resistance compared to articles obtained via conventional methods. Among other advantages, possibly due to the specific features of the disclosed metal alloy, including, but not limited to, the presence of tantalum and the absence of boron, the articles of the present disclosure are more easily weldable and without cracks, as shown in FIG. 5, and have improved mechanical resistance even when exposed to high temperature for prolonged time, which are the common operating conditions for certain parts of turbomachinery (e.g. nozzles).

In particular, FIGS. 1 and 2 show the comparison between the surface of an article obtained following a conventional process (Investment Casting, IC) (FIG. 1), and the surface of an article (additive manufacturing, AM) produced as disclosed herein (FIG. 2). It can be appreciated that the surface of the article as disclosed herein is much smoother and fundamentally free of micro-fractures, i.e. the microstructure of the alloy has been optimized. In particular, the topologically close-packed phase (TCP phase) is minimized and the precipitation of relatively coarse-sized granules along the grain boundaries is not observed. FIG. 5 shows the comparison of two samples, both obtained via AM, using a metal alloy comprising 0.007 wt % boron (powder A, comparative sample) and a metal alloy comprising less than 0.002 wt % boron (powder B, according to the present disclosure). The presence of cracks is visible in the sample consisting of comparative alloy A, whereas cracks are not detectable in the sample of alloy B according to the present disclosure.

Figure 3:
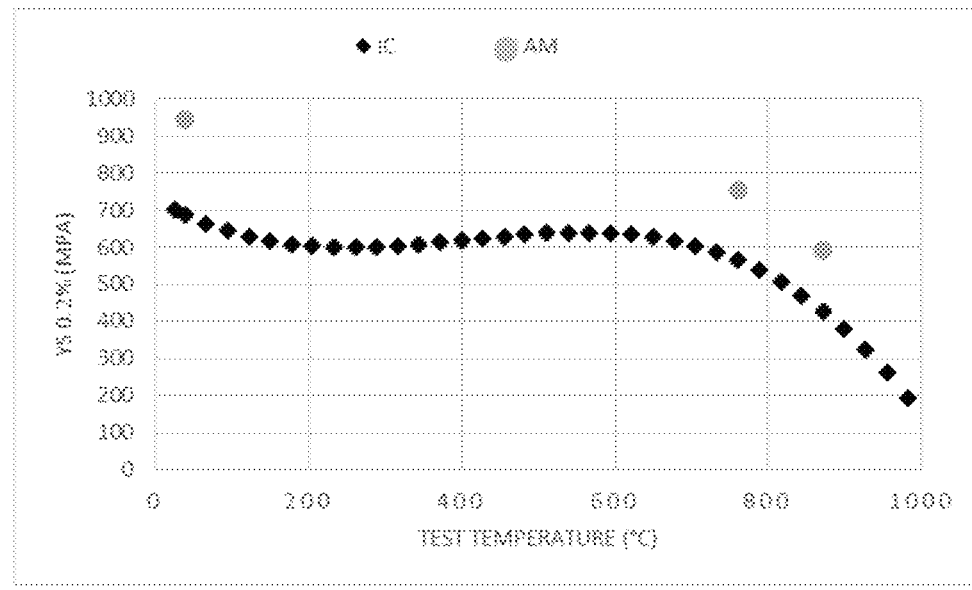
FIG. 3 illustrates the result of tests carried out to determine the yield strength (also referred to as yield stress, indicated YS) of an article produced as disclosed herein (AM, diamonds) compared to that of an article prepared according to a conventional process, as in FIG. 1 (IC, large squares)

The results of FIG. 3 shows clearly that, at all the tested temperatures, the material as produced according to the presently disclosed method (AM) has a yield strength higher than that of the comparison sample.

Figure 4:
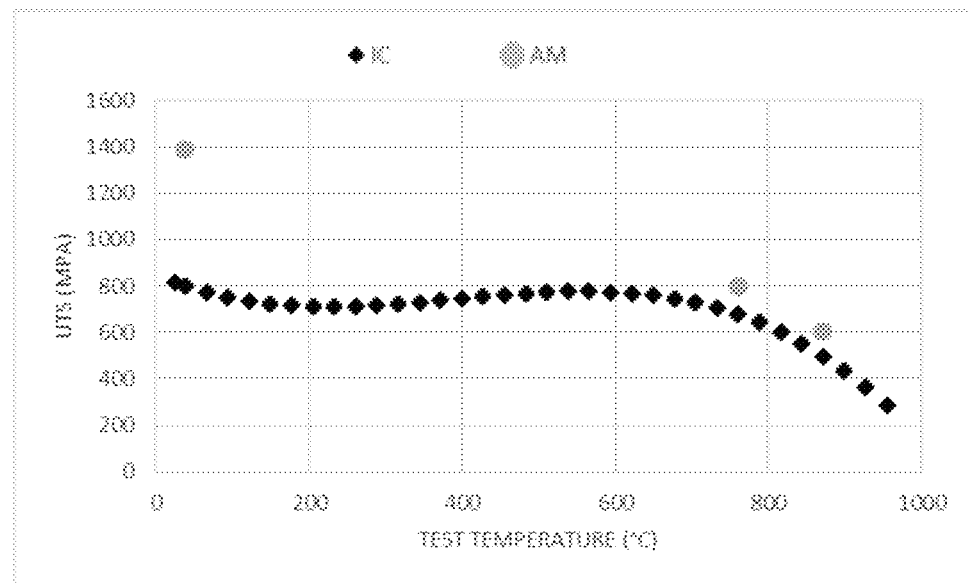
FIG. 4 illustrates the result of tests carried out to determine the ultimate tensile strength (UTS) of an article produced as disclosed herein (AM, diamonds) compared to that of an article prepared according to a conventional process, as in FIG. 1 (IC, large squares)

Similarly, in FIG. 4 it is shown that the ultimate tensile strength (UTS) for the sample produced according to the presently disclosed method (AM) is higher than that of a sample produced according to a conventional technique (IC).

Without being bound by theory, it is possible that the superior properties of the article produced according to the presently disclosed method are linked to the alloy microstructure and to the technique of forming the article by subsequent deposition of the metal alloy layers obtained by punctual fusion of the starting powder.

The presently disclosed method allows to obtain an article useful for applications which include, without limitation, gas turbines with a reduction in costs and production times and with the opportunity of new designs and combinations.

In a preferred embodiment, in the method as disclosed herein the energy source is a beam of collimated high-energy particles or radiation, such as, but not limited to: laser beam (SLM or LMD) or an electron beam (EBM).

In a preferred embodiment, in a method as disclosed herein the laser beam may be either a ytterbium-doped fiber laser or a $CO_2$ laser.

In a preferred embodiment, in the method as disclosed herein the laser power is in the nominal range from 150 W to 370 W, preferably from 240 W to 320 W, more preferably from 260 W to 300 W.

In a preferred embodiment, in the method as disclosed herein the thickness of the powder layer is between 0.001 mm and 0.08 mm, preferably between 0.04 mm and 0.06 mm.

The scans are preferably made so that two successive layers overlap, so the presence of the next layer allows stress and can result in a material treated thermally in a uniform manner.

In a preferred embodiment, in the method as disclosed herein the space between a scan line of the energy source and the next is less than 0.15 mm (150 μm) or less than 0.12 mm, or, more preferably, from 0.10 to 0.15 mm.

In a preferred embodiment, in the method as disclosed herein the rate of powder scanning by the energy source is from 500 mm/sec to 5000 mm/sec, preferably from 800 mm/sec to 2200 mm/sec.

Moreover, the object of the present disclosure is a three-dimensional article made of metal alloy obtained by the method as disclosed herewith.

In a preferred embodiment, in the article as disclosed herein, the metal alloy comprises from 22.3 to 22.7 wt % chromium. In a preferred embodiment, in the articles as disclosed herein, the metal alloy comprises from 18 to 19 wt % cobalt. In a preferred embodiment, in the article as disclosed herein, the metal alloy comprises from 1.9 to 2.1 wt % tungsten. In a preferred embodiment, in the article as disclosed herein, the metal alloy comprises from 0.7 to 1.2 wt % niobium. In a preferred embodiment, in the article as disclosed herein, the metal alloy comprises from 2.25 to 2.35 wt % titanium. In a preferred embodiment, in the article as disclosed herein, the metal alloy comprises from 1.7 to 2.1 wt % aluminium. In a preferred embodiment, in the article as disclosed herein, the metal alloy comprises from 0.03 to 1.1 wt % tantalum. In a preferred embodiment, in the article as disclosed herein, the metal alloy comprises from 0.05 to 0.06 wt % carbon. In a preferred embodiment, in the article as disclosed herein, the metal alloy consists of, by weight with respect to the total weight of the alloy: from 22.2 to 22.8% chromium, from 18.5 to 19.5% cobalt, from 1.8 to 2.2% tungsten, 0.7 to 1.45% niobium, 2.2 to 2.4% titanium, 1.6 to 1.8% aluminum, 0.05 to 0.12% carbon, optionally about 0.02 to 0.5% tantalum and the remaining to reach 100% is nickel and inevitable impurities.

In a preferred embodiment, the three-dimensional article as disclosed herein can be a turbomachinery apparatus or component of the turbomachinery apparatus. For example, the three dimensional article as disclosed herein can be a component of a turbine, such as, but not limited to: a gas turbine, a steam turbine, such as one operating at high temperature, a hydroelectric—water turbine, and/or a wind turbine; or can be a component of other types of turbomachinery equipment including, but not limited to, pumps, compressors, engines, turboexpanders, etc.

The subject-matter disclosed herein relates to the use of a three-dimensional metal alloy article obtained as described above as a new, replacement, or retrofit component of: a gas turbine, a steam turbine, such as one operating at high temperature, a hydroelectric—water turbine, and/or a wind turbine; or a component of other types of turbomachinery equipment, preferably as the component of a gas turbine apparatus working at high temperature.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Unless otherwise indicated, within the context of the present disclosure the percentage quantities of a component in a mixture are to be referred to the weight of this component in grams with respect to the total weight of the mixture (also indicated as wt %).

Unless otherwise specified, within the context of the present disclosure the indication that a composition "comprises" one or more components or substances means that other components or substances may be present in addition to that, or those, specifically indicated and the indication that a composition consists of certain components means that no component other than those explicitly listed is present in the composition.

Unless otherwise specified, within the scope of the present disclosure, a range of values indicated for an amount, for example the weight content of a component, includes the lower limit and the upper limit of the range. For example, if the weight or volume content of a component A is referred to as "from X to Y", where X and Y are numerical values, A can be X or Y or any of the intermediate values.

Unless otherwise indicated, within the scope of the present disclosure the term "about" indicates a tolerance range as generally understood in the field of metallurgy, for example with deviation of 5%, 2%, 1%, 0.5%, 0.2%, 0.1% or 0.05% from the indicated value.

In the context of the present disclosure, the term "inevitable impurities" indicates the possible components found in alloys and metal compounds, in negligible or difficult to quantify quantities, as a result of the processes of formation and processing, as known to the expert in the field of metallurgy, typically not more than 0.001 wt %.

Reference now will be made in detail to embodiments of the disclosure, one example of which is reported hereunder. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When introducing elements of various embodiments the articles "a", "an", "the", and "said" are intended to mean that there are one or more of the elements. The terms "comprising", "including", and "having" are intended to be inclusive and mean that there may be additional elements other than the listed elements.

EXAMPLE

The AM alloy, whose mechanical characteristics and microstructure are reported in this document, was obtained by direct metal laser melting (DMLM), wherein the power source had an energy power of about 280 W and a scanrate of 2000 mm/sec.

The power source scan spacing was preferably arranged in order to provide substantial overlapping of adjacent scan lines.

One suitable powder used for the method for the additive manufacturing (AM) according to the present disclosure (supplier: General Electric Company) has a weight composition with respect to the total weight of the powder, of about 22.4% chromium, about 18.6% cobalt, about 2.0% tungsten, about 1.3% niobium, about 2.3% titanium, about 1.7% aluminum, about 0.02% tantalum, about 0.06% carbon and the remaining to 100% is nickel and inevitable impurities.

The IC material (supplier General Electric Company) used in testing via conventional investment casting had the following chemical composition: about 22.4% chromium, about 18.9% cobalt, about 2.0% tungsten, about 1.0% niobium, about 2.3% titanium, about 1.7% aluminum, about 0.5% tantalum, about 0.1% carbon and the remaining to 100% nickel and inevitable impurities.

The surface of an article obtained following a conventional process (IC) is shown in FIG. 1 and the surface of an article (AM) produced as disclosed herein is shown in FIG. 2. The results of tests conducted with the IC sample and with the AM sample are illustrated in FIGS. 3 and 4.

What is claimed is:

1. A method for the additive production of a three-dimensional metal alloy article, comprising the steps of:
   i. preparing a layer of powder of a metal alloy on a substrate;
   ii. subjecting the powder layer prepared in the previous step to scanning with an energy source so as to melt the powder in at least one point of the layer and removing the source of energy from said point so as to solidify the metal alloy and form a layer with a desired shape;
   iii. re-preparing a layer of metal alloy powder, which is in direct contact with the solidified metal alloy layer obtained in step ii; and
   iv. repeat the steps ii. and iii. until the desired three-dimensional metal alloy object is obtained,
   wherein said metal alloy powder has a weight composition, with respect to the total weight of the powder, from about 22% to about 23% chromium, from about 18% to about 20% cobalt, from about 1.5% to about 2.5% tungsten, from about 0.5% to about 1.5% niobium, from about 1.8% to about 2.7% titanium, from about 1.0% to about 2.0% aluminum, from about 0.02% to about 1.20% tantalum, from about 0.04% to about 0.2% carbon, and the remaining to 100% is nickel and inevitable impurities.

2. The method of claim 1, wherein the energy source is a beam of collimated high energy particles.

3. The method of claim 1, wherein the energy source is ytterbium-doped fiber laser.

4. The method of at least one of claim 1, wherein the laser power is in a range from 150 W to 370 W.

5. The method of claim 1, in which the thickness of the powder layer is between 0.001 mm and 0.08 mm.

6. The method of claim 1, wherein the space between a scan line of the energy source and the next one is from 0.10 mm to 0.15 mm.

7. The method of claim 1, wherein the scanning speed is from 500 mm/sec to 5000 mm/sec.

8. The method of claim 1, wherein the energy source is a laser beam (SLM).

9. The method of claim 1, wherein the energy source is an electron beam (EBM).

10. The method of claim 1, wherein the energy source is a $CO_2$ laser.

* * * * *